Figure 1:
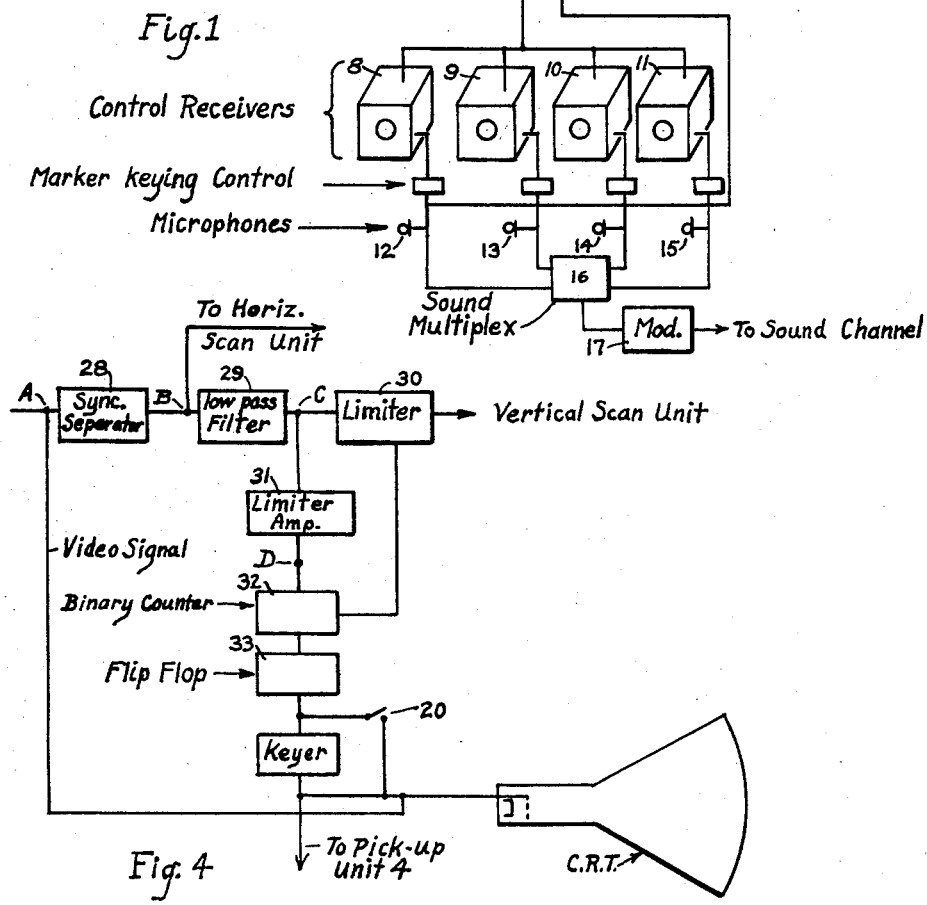

March 29, 1960  J. R. DONNAY  2,930,844
SHORT RANGE NAVIGATIONAL AND LANDING SYSTEM
Filed Sept. 10, 1953  2 Sheets-Sheet 1

INVENTOR
Jacques R. Donnay

BY Ralph B. Stewart

ATTORNEY

March 29, 1960  J. R. DONNAY  2,930,844
SHORT RANGE NAVIGATIONAL AND LANDING SYSTEM
Filed Sept. 10, 1953  2 Sheets-Sheet 2
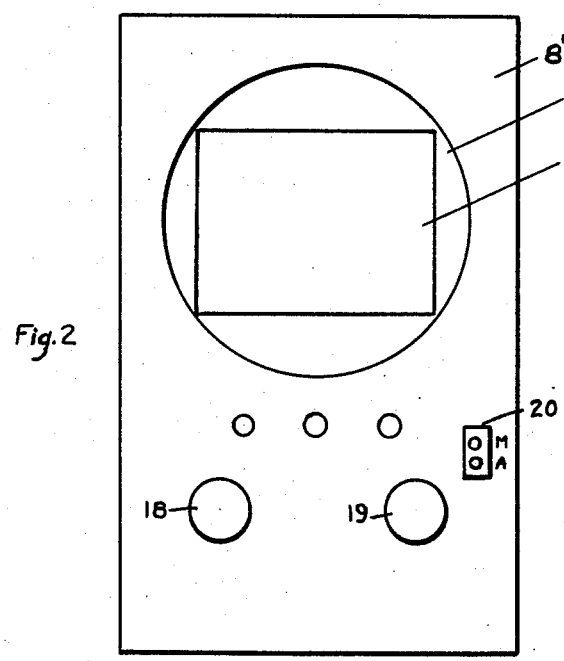
Fig. 2
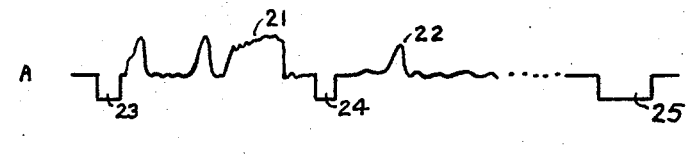
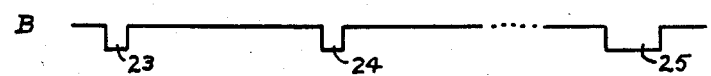
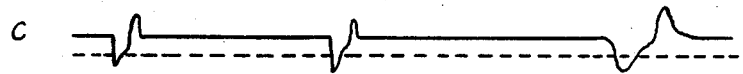
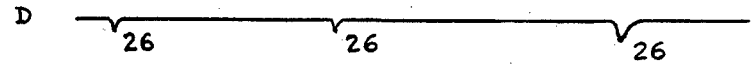
Fig. 3
INVENTOR
Jacques R. Donnay
BY Ralph B. Stewart
ATTORNEY

United States Patent Office 2,930,844
Patented Mar. 29, 1960

2,930,844
SHORT RANGE NAVIGATIONAL AND LANDING SYSTEM

Jacques René Donnay, Paris, France, assignor to Societe Nouvelle de l'Outillage R.B.V. et de la Radio Industrie (R.B.V.-R.I.), Paris, France, a joint-stock company Application September 10, 1953, Serial No. 379,356

Claims priority, application France September 12, 1952

6 Claims. (Cl. 178—5.6)

The present invention is concerned with an all electronic navigational and landing system, intended both for sea and air navigation, which may be operated by any completely unskilled operator on board the landing craft. It is mainly, though not exclusively, intended for guiding boats in the vicinity of a harbour or planes which are already near their landing area.

Many different systems have already been proposed to solve such a problem. It is well known for instance to place on the landing area a detecting and ranging equipment of the radar type which supplies the radar receiver on board the craft with the radar map of the landing area. This solution requires an expensive and complicated electronic equipment on board the craft with the corresponding maintenance and servicing problems. Reading a radar map requires a skilled operator especially when the geographical surroundings are not well known.

It has been proposed, by way of simplification and to reduce the costs of the on-board landing equipment, to locate both the direction and ranging transmitting and receiving equipments on land and to relay or transfer the picture which is displayed on the high precision radar receiver. The on-board equipment is thus much simpler. To facilitate reading of the display it is usual to superimpose the geographical map of the landing area onto the relayed or transferred display so that each echo appears at its right place on the map. This improved landing system shows still many disadvantages of which the more important are stated below:

The picture appearing on the on-board receiver is the exact replica of the radar display. As is well known it is usual to use for such displays a polar coordinate representation of the plan position indicator type when a good precision is required. It is therefore necessary to provide at the receiver a high precision synchronisation of the scanning which requires an expensive servosystem with the corresponding maintenance problems.

The reading of the radar map even with the superimposed geographical map is a difficult operation which cannot be performed by an unskilled operator when a radar type of receiver is used.

It is therefore an object of the invention to provide a landing system which can be operated without any skilled operator being on board the guided craft, working with a very simple and inexpensive on-board equipment, and requiring no maintenance.

It is another object of the invention to provide a landing system in which each particular craft is identified by a twinkling spot the twinkling frequency of which is different for each craft.

It is another object of the invention to provide a landing system in which the scale of the map appearing on board the guided craft may be changed at will, without requiring any adjustment of the on-board receiver.

It is another object of the invention to provide a landing system in which the visual identification of each craft is made unmistakable by the assistance of audio guiding facilities.

In a landing system according to the invention, a complete high precision radar equipment is provided on land together with a television equipment comprising a transmitter televising both the display of said radar receiver and a drawing such as the geographical map of the scanned field and several control receivers, each control receiver including an adjustable marking generator delivering to said television transmitter a marker signal occuring in coincidence with any particular dot of the televised picture received.

According to a preferred embodiment of the invention, the marking generator of each receiver includes an electronic keyer the working frequency of which identifies said control receiver, said keying frequencies being simultaneously selectively transmitted to the guided craft through a sound channel. That means that each target selected by a control operator appears on the on-board receiver as a twinkling spot. The twinkling frequency is selectively transmitted to the corresponding target by means of an associated sound channel.

The invention will be easily understood by referring to the following description together with the appended drawings.

Figure 1 shows a diagram of the land equipment used in a landing system according to the invention. Figure 2 shows the front panel of a preferred embodiment of a control television receiver operated from the land station. Figure 3 shows different waveforms of signals inside said receiver. Figure 4 shows a block diagram of said control receiver.

Box 1 on Figure 1 represents the indicator of the high precision radar equipment used on land to locate the different crafts which are arriving near to their landing point. A display of the different geographical and moving targets appears on the screen of a cathode ray tube as shown by circle 2. A television pick-up unit 4 is placed in front of said picture. A drawing 5, shown as the geographical map, is superimposed by means of any well known optical device such as semi-transparent mirror 3 with the radar display. Any optical system designed to superimpose two separate objects may be used. Map 5 may bear any hand made indication which is necessary at any moment of the landing.

The pick-up equipment 4 delivers a signal which is representative of the radar display coincident with the map and/or the written indications of chart 5. This signal is fed directly to the modulator 6 of the television transmitter not shown on the figure. At the same time the video signal is supplied to a series of control receivers 8, 9, 10, 11, etc., located in the same room as the equipment, or in a control room, by means of cable 7. The number of control receivers used depends on the volume of the traffic. Each control receiver is associated with one channel of a multichannel sound link as shown by the microphones 12, 13, 14, 15, etc., feeding the multiplexing unit 16 and the modulator 17 which is connected either to a special transmitter or to the sound channel of the television transmitter. As will be explained in connection with Figure 4, each control receiver is provided with an adjustable marker pulse generator which enables the operator to select any particular spot on the television picture and delivers a signal identifying said spot. The marking signals are fed back to the modulator 6 through an additional connection.

Each marking signal appears directly on the corresponding control receiver.

Figure 2 shows the front panel of any of the control receivers 8—11 of Figure 1. The television picture appears as 1' on the screen 2' of the viewing cathode ray tube. The series of the upper buttons represents the usual controls of a television set (general switch, brightness, focus, etc).

The two large buttons 18 and 19 are the controls of the marker generator. By turning button 18 the operator controls the vertical position of the marker signal and button 19 sets the position of said marker signal along a horizontal line of the television raster. An indicator is ganged with control 18, its dial also appears on the front panel of the set.

According to a preferred embodiment of the invention, the control receiver is provided with a third special control shown as switch 20. It controls the operation of an electronic keyer (position M for work, and A for rest) which controls the marking signal intensity at a very low frequency (between 1/10 and 10 cycles per second) which is different on each control receiver. When the keyer is on, the marker appears as a twinkling dark or bright spot on the control and on-board receivers. The same keying signal is sent through the sound channel associated with the receiver, to help in identifying each target.

Curves A, B, C, D of Figure 3 show the waveform of the signal appearing at different points of the video section of the control receiver and shown by the same reference letter on the block diagram of Figure 4. They correspond to the usual shape of television signals using a positive modulation and the shape of synchronisation pulses according to the French telecasting standard, by way of example. The type of television signals used has no importance in the working out of the invention. Waveform A shows the complete television signal as supplied by the pick-up unit 4 to the control receiver; it comprises line synchronisation pulses such as 23, 24, etc., frame synchronisation pulses such as 25, video modulation such as 21, 22.

Curve B shows the output signal from synchronisation separator 28 comprising only line and frame pulses.

Curve C shows the same signal as differentiated by the low pass filter 29. This signal is fed to the horizontal scanning unit, and (by means of a limiting stage 30 which transmits only the highly positive peaks due to the long frame synchronisation signals), to the vertical scanning unit.

Curve D shows the output signal from limiting stage 31 which transmits only the parts of the signal which are below the interrupted line of curve C. It comprises the short pulses 26 at the line frequency. Said pulses 26 are coincident with the leading edge of the synchronisation pulses.

As shown on Figure 4, pulses 26 are fed to the adjustable binary counter 32 which is designed so as to count, by unitary steps, any integer ranging from one up to the total number of lines scanned during one picture period by the pick-up unit 4. Counter 32 is reset by the output pulses from limiter 30, that is at the end of each frame. Control of counter 32 is achieved by button or knob 18 (see Figure 2). An electromechanical indicator is ganged with the control of the binary counter. The pulse selected by the counter 32 is fed to an adjustable delay network 33, the delay of which may be varied from zero up to the duration of one line. Delay network 33 is controlled by means of button or knob 19 (see Figure 2). The output signal of the delay network is the marking signal pulse which is fed directly to the viewing cathode ray tube CRT and back to the output of the pick-up equipment 4. Delay network 33 is preferably of the adjustable multivibrator type. Switch 20 is hand operated by the operator in charge of the control receiver. It is effective in one of its settings to short-circuit the electronic keyer 34. Keyer 34 modulates the marking signal at a constant frequency as said above. The same keyer, or a ganged keying unit, controls at the same frequency the output of an audio frequency oscillator in the associated sound channel 12—16—17. For the purposes of simplification the video channel bandwidth of the television transmission should be chosen as low as possible. The map of drawing 5 being a still picture, the standard, that is to say the number of frames and lines per second and the video channel bandwidth, are defined by the radar display. As is well known radar cathode ray tube phosphors are more persistent than the commercial television phosphors owing to the rather slow scanning by the radar antenna. The delaying action of said phosphor makes it possible to use a frame frequency which is much lower than the frame frequency used for telecasting, without loss of definition with respect to the radar picture. To avoid flicker in the control and on-board receivers, it has been found necessary to use in the receivers long persistence cathode ray tubes.

It is another important feature of the invention to relay the radar picture by means of a narrow band television link and to equip the television receivers with long persistence cathode ray tubes.

Experience has shown that it is not necessary to use an interlaced scanning which is also a simplification as far as synchronisation is concerned. The different networks of the control receiver are well known in the art.

The landing system works in the following way; all the crafts nearing their landing point appear on the radar display 2 of Figure 1 as slowly moving spots. They all appear on the television control receivers as moving along paths which are easily seen on the superimposed map. Each control operator in front of his control receiver selects by means of his control knobs 18 and 19 a particular craft which he will take in charge. To do so he moves his own marker first vertically and then horizontally until it is coincident with the echo of the craft he has selected. He sees his own marker moving along the televised picture. He can follow its movement on the indicator of his counter. He then informs the craft by means of his sound channel of what the craft has to do. On board, the navigator sees the same television picture with the echoes from all the targets and all the markers from the different landing controllers. Once the telephone contact is established, the controller sets his switch 20 so that his marker will twinkle, the twinkling frequency being sent as a keying signal of a continuous audio signal along the telephone channel until the navigator has identified his own echo on the display. The navigator can follow during all the landing his own position on the superimposed map which provides for the safety checking of the good operation of the whole guiding system. If any general information should be communicated, it may appear as a mark on map 5.

If for any reason, a particular portion of the scanned area should be given a special care, it is possible by expanding the sweep of the radar display and changing the scale of the map 5, to increase the precision of the display in that particular portion of the field.

Owing to the simplicity of the on-board equipment, it is preferable for security to equip each craft with two television receivers so as to eliminate any maintenance problem.

In a particular embodiment of the invention, the width of the video channel of the television link is 400 kilocycles per second, the picture frequency being one per second.

What I claim is:

1. In a guiding system, the combination of a fixed radar detection and ranging station including a visual indicator producing a radar display of an area, a television transmitter for transmitting video signals of said display, a plurality of control television receivers, each receiving the video signal from said transmitter and reproducing a picture of said display, each control receiver including means for generating a marker pulse of adjustable timing for display on each receiver and means for introducing the marker pulse of each control receiver into the video channel of said television transmitter, and a keying device embodied in each control receiver for interrupting the transmission of the marking signal at a predetermined frequency individual to each receiver.

2. A guiding system according to claim 1 wherein said means for producing a marker pulse of adjustable timing comprises, in each control receiver, means for separating line synchronizing pulses from the signal received from said transmitter, an adjustable pulse counter controlled by said separated pulses and producing a single output pulse upon counting a predetermined number of line synchronizing pulses, an adjustable delay device connected to the output of said pulse counter for variably delaying the transmission of said output pulse, and means controlled by each frame synchronizing pulse for re-setting said counter.

3. A guiding system as in claim 1 in which the means for generating a marker signal in each receiver is controlled by the line synchronization pulses of each such receiver.

4. A guiding system according to claim 1, and including an auxiliary signal generator for generating a distinctive signal for each control receiver, means for transmitting said auxiliary signals simultaneously with said video signals, and several mobile receivers within the given area for receiving said television signal, each mobile receiver including means for selectively receiving an individual one of said identifying signals.

5. A guiding system according to claim 4 wherein said identifying signals comprise audio signals of different frequencies individual to said control receivers, and each control receiver is provided with a keying device for interrupting the transmission of its marker signal at the frequency of its identifying signal.

6. A guiding system for displaying on board of a given craft the instantaneous position of a plurality of crafts with respect to a given area comprising a radar station giving a display of the positions of the crafts in the area on the screen of a cathode ray tube, optical means to superimpose said display onto a map representation of said area and to project the composite image onto a television camera, means for transmitting video signals generated by said camera, a television receiver on each of the crafts, a plurality of control television receivers for displaying the composite image, manually controlled means at each of the control receivers for superimposing a luminous marking on the radar indication corresponding to a given craft as displayed on the control receiver and to produce a timing signal indicative of the position of the luminous mark, means for transmitting each of the timing signals to the video transmitting means, audio transmitting means at each control television receiver for communication with the given craft, means at each control receiver for keying the luminous mark to vary its brightness at a different predetermined rate respectively, and to transmit audio signals keyed at the predetermined rate to the given craft.

References Cited in the file of this patent

UNITED STATES PATENTS

| | | |
|---|---|---|
| 2,480,068 | Wolff | Aug. 23, 1949 |
| 2,502,317 | Ewing | Mar. 28, 1950 |
| 2,506,127 | Allen | May 2, 1950 |
| 2,513,490 | Jones | July 4, 1950 |
| 2,527,967 | Schrader | Oct. 31, 1950 |
| 2,621,246 | Clagden et al. | Dec. 9, 1952 |
| 2,632,157 | Jones | Mar. 17, 1953 |